Jan. 12, 1932. T. ABRAMS 1,840,878
AIR VIEW CONTOUR FINDER
Filed Jan. 9, 1930 2 Sheets-Sheet 1
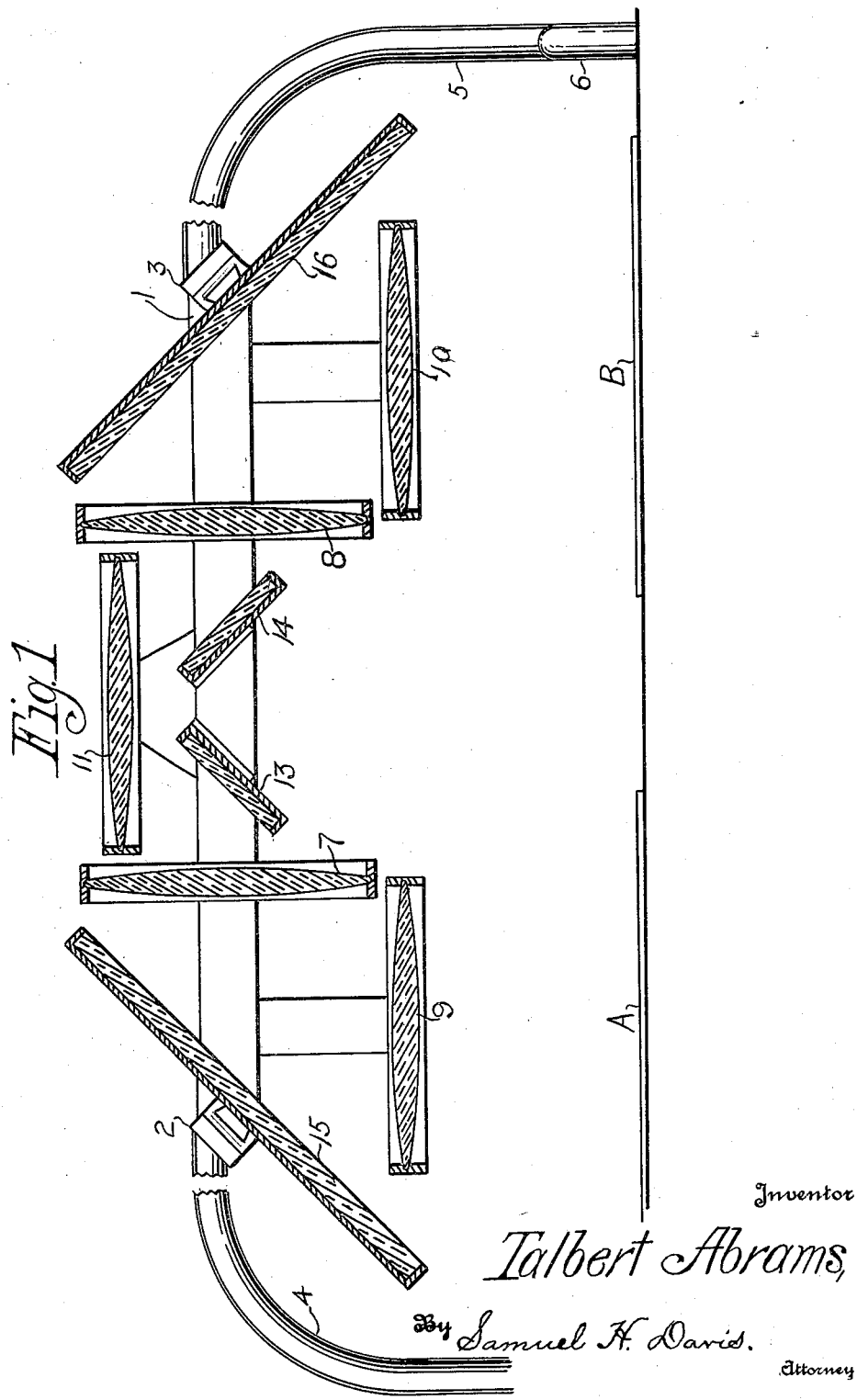
Inventor
*Talbert Abrams,*
By *Samuel H. Davis.*
Attorney

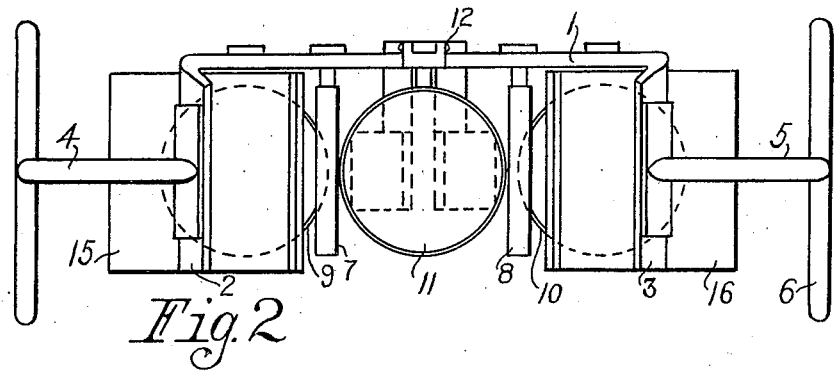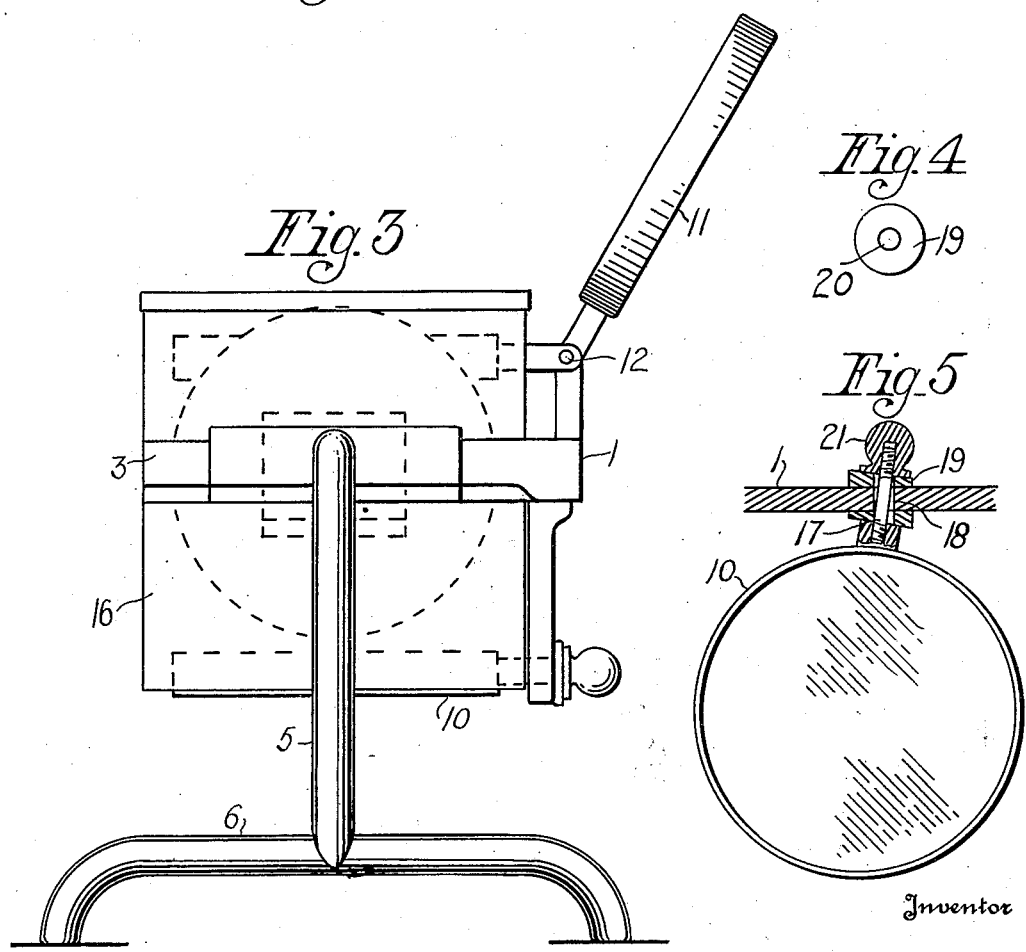

Patented Jan. 12, 1932

1,840,878

UNITED STATES PATENT OFFICE

TALBERT ABRAMS, OF LANSING, MICHIGAN

AIR VIEW CONTOUR FINDER

Application filed January 9, 1930. Serial No. 419,640.

This invention relates to air view contour finders, and belongs with that class of apparatus used by placing a pair of photographs, which show the same territory taken from two different view points at the same elevation in an aeroplane, upon a suitable support under the apparatus one photograph on either side of the center line. The photographs are then examined by looking through a magnifying lens termed for the purposes of this description an observation lens, one eye of the observer being on one side of the center line while his other eye is directed similarly upon the other side of the center line. In other words one eye of the observer takes in one photograph and the other eye the second photograph, and by special adjustment of the lenses the third dimension or depth of the pictures and also the size thereof is enlarged, making it much easier for the operator to study the smaller details set out in the photographs as well as the relatively higher or lower positions of the objects in the photographs and the height thereof with the forms and size of each.

The object of this invention is the production of an apparatus of special construction and arrangement of its parts, which is cheap to construct, particularly simple in operation and which may be readily taken apart and the portions again assembled by any person even if not especially familiar with such instruments.

It is possible by the use of this invention for even a comparatively unskilled observer to make a useful topographical drawing of any section of country, using a series of over-lapping aerial photographs which show the same territory in two or more vertical or semi-vertical pictures.

The special construction and arrangement of the parts of this invention are illustrated in the accompanying drawings, of which Fig. 1 represents a side view of all parts assembled, and shown partly in section. Fig. 2 is a top view upon a smaller scale of drawing. Fig. 3 is an end view from the right hand end of Fig. 1. Fig. 4 shows one of the disks used in the lens adjustments. Fig. 5 shows one of the lens adjustments by means of the disks with slanting faces, and a screw and thumb nut.

Throughout the drawings the same number is used to refer to the same part.

Considering the drawings, a frame 1 of any chosen form is provided with transverse grooved arms 2 and 3, and vertical legs 4 and 5, each leg having a foot piece such as the piece 6. The form of the frame or stand may plainly be modified within the purview of this invention.

There are two vertically disposed lenses 7 and 8, and two horizontally placed lenses 9 and 10.

The frame 1 carries a pivotal lens 11 termed for the purposes of this explanation the observation lens, and it is pivotally supported so as to be moved transversely of the frame into and out of observing position. The pivotal connection of this lens is designated by number 12. Below the observation lens are two relatively smaller reflectors 13 and 14 in inclined positions, slanting in opposite directions, and those reflectors direct the vision through the vertical lenses 7 and 8 and upon the relatively larger reflectors 15 and 16 inclined in directions substantially similar to the inclinations of the smaller reflectors.

It is desirable in the use of this invention to angularly adjust or position the various lenses, and in Fig. 5 is set out one means employed for such purpose. A screw pin has one end in engagement with the stem of the lens, and the frame 1 is provided with an opening 18 somewhat larger than the pin 17. Two slanting disks 19 are used one on either side of the frame and the disks are made with central openings 20 through which the pin 17 may pass. A thum knob or head 21 engages the other end of the pin 17, and the lens, disks and frame are thereby clamped together. It will be observed that the lens may be arranged in a variety of inclinatory attitudes with respect to the frame.

It is equally desirable at times to change the reflectors and the grooved arms 2 and 3 permit the reflectors 15 and 16 to be slipped out and others introduced in place thereof as desired. It is believed to be within the scope of this invention to similarly fashion the small reflectors 13 and 14 with like detachable supports. This invention is not intended to be confined to such details immediately, as they are parts of common use and are made in numerous shapes and vary in their modes of adjustment.

In the operation of this invention, as previously explained herein, two photographs A and B are placed upon a suitable table or support C in proper position. The observation lens 11 is swung over above the frame, and the observer looks in the lens thus seeing one photograph with one eye and the other photograph with the other eye, the usual stereoscopic effect resulting giving to the objects observed the appearance of solid reality, and enabling the observer to closely determine their sizes, shapes, heights, and the inclination and contour of the land as shown in common in both photographs.

Having now described this invention I claim:—

1. In an air view contour finder, the combination with a supporting frame and stand, of spaced horizontally disposed lenses supported by the frame, reflectors carried by the frame in detachable relation thereto above said lenses and arranged to reflect light towards each other, vertical lenses arranged to intercept light from the said reflectors, spaced reflectors carried by the frame between said vertical lenses and arranged to direct light upwardly, and a pivotally supported observation lens adapted to be swung bodily vertically downward above said spaced reflectors last mentioned or to be turned upwardly towards the side of the frame.

2. In an air view contour finder, the combination with a supporting frame, of spaced vertically disposed lenses supported by the frame, adjustable horizontal lenses supported by the frame at a lower point than the vertical lenses but adjacent thereto and located towards the opposite ends of the frame, oppositely inclined reflectors supported by the frame between the said vertical lenses, inclined reflectors supported by the frame between the said vertical and horizontal lenses and located towards the ends of the frame, and an adjustable observation device bodily movable into a position above the said reflectors between the vertical lenses and from such position.

In testimony whereof I affix my signature.

TALBERT ABRAMS.